United States Patent Office 3,299,120
Patented Jan. 17, 1967

3,299,120
MIXED GLYCOL ESTER OF 2,3,6-TRICHLORO-
PHENYLACETIC ACID AND TRICHLORO-
ACETIC ACID
Jack S. Newcomer, Wilson, Edward D. Weil, Lewiston, and Edwin Dorfman, Grand Island, N.Y., assignors to Hooker Chemical Corporation, Niagara Falls, N.Y., a corporation of New York
No Drawing. Filed Apr. 12, 1965, Ser. No. 447,529
1 Claim. (Cl. 260—476)

This application is a continuation-in-part of Serial Number 101,060, filed in the United States Patent Office April 6, 1961, now abandoned, which is a continuation-in-part of Serial Number 730,051, filed in the United States Patent Office April 22, 1958, now abandoned.

This invention describes a herbicidal composition of matter derived from 2,3,6-trichlorophenylacetic acid and a process for preparing it. More specifically, this invention relates to the glycol ester of 2,3,6-trichlorophenylacetic acid and trichloracetic acid which has superior characteristics as a herbicide and soil sterilant.

The novel compound of this invention is prepared by the esterification of glycol with substantially equal molar amounts of 2,3,6-trichlorophenylacetic acid and trichloroacetic acid. The structural formula for this compound is believed to be

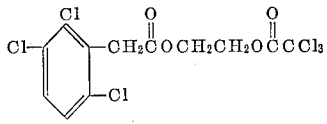

The unsymmetrical structure of this compound greatly enhances its herbicidal properties.

The high cost of labor and farm machinery have made the hand or machine suppression or eradication of weeds economically unfeasible. For this reason, there has become an increasing tendency on the part of growers to rely more and more on chemical control of weeds through the use of herbicides. Since herbicides structurally comprise many diverse classes of substances, it is not surprising that different crops differ markedly in their sensitivity or resistance to the vast number of herbicides now in commercial use. Thus, while a degree of phytotoxicity against a broad spectrum of weeds, selectivity and ease of formulation are still the sine qua non of a herbicide, the volatility and persistance of a herbicide play an important part in its commercial acceptance.

An important advantage of the herbicidal composition of this invention is that its phytotoxicity toward many weeds persists for long periods of time after its application to the soil. The reason for long term persistance in the soil is not obvious or well understood. For this reason, no theory of operation or mechanism is advanced, but it is a major factor in the value of this composition as soil sterilant, in volume crops, such as sugar cane where frequent hand or mechanical cultivating is economically prohibitive. In addition, this composition, because of the low cost and high phytotoxicity toward a variety of weeds and grasses, is especially useful as soil sterilant on low grade land, such as public and private thoroughfares, road shoulders, railroad beds, rights of way, and drainage and irrigation ditches. The composition is especially phytotoxic toward weeds and grasses including among other, quackgrass, wild bluegrass, Johnson grass, wild carrot, ragweed, chicory, Canadian thistle, plantains, oxalis, daisy, yarrow, foxtail, bindweed, milkweed, mustard and dock.

The compound of this invention may be utilized as either the highly purified product or as the technical crude as well as states of purity intermediate to these purity extremes. It may be applied alone or diluted with liquid or solid carriers or diluents. Other herbicides, fungicides, insecticides or soil sterilants may be used as the diluents. For example, the composition may be combined with other herbicides, such as the 2,4,dinitro-6-alkylphenols, pentachlorophenol, ammate, the phenylureas, such as N - m - trifluoromethylphenyl - N',N' - dimethylurea, N-p-chlorophenoxyphenyl-N',N'-dimethylurea, linuron, monuron or diuron, the triazines, such as 2,4-dialkylamino-6-methoxy-sym-triazenes, 2,4, - dialkyl - amino-6-methylthio-sym - triazine, 2,4 - dialkylamino - 6 - chloro-sym-triazine, the chlorophenoxyaliphatic acids such as 2,4-D and 2,4,5-T, the trichloroacetates, chlorates, dichloropropionates, borates, S-alkyl - N,N - dialkylthio - carbamates, α-chloro-N-substituted acetamides, α-chloro-N,N-disubstituted acetamides such as α-chloro-N,N-dialkylacetamide, the chlorobenzoic acids such as trichloro- and polychlorobenzoic acids, trichloroaminopicolinic acid, aminotriazole diphenylacetamides, dichlorobenzonitriles, herbicidal uracils and the like. Optionally, the composition may be combined with fungicides such as sulfur, captan or the metal dimethylthiocarbamates. Typical compatible insecticides are malathion, chlordane, DDT, benzene hexachloride and the like. Soil sterilants such as the alkali and alkaline earth metal chlorates and borates, and the above-mentioned triazines and ureas appear to have an enhanced effect greater than additive, by combination with the inventive composition.

The composition of this invention readily lends itself to formulation ranging from the simple to most complex. They may be mixed with the conventional pest control and herbicide adjuvants, modifiers, diluents or conditioning agents so that it may be formulated as solutions, emulsions, dispersions, wettable powders or dusts. The diluents may be solids of varying particle size, such as sawdust, clay, earth, mica, cereal flours, starches, diatomaceous earth and the like. Typical liquid carriers among others are water, petroleum fractions, liquid aliphatic or aromatic alcohols, esters, glycols and ketones. The liquid formulations, whether solutions or dispersions, emulsions or wettable powder dispersions, may contain as a conditioning agent one or more surface active agents in amounts sufficient to impart the desired characteristics to the formulation. By the term surface active agent are included wetting agents, dispersing agents, emulsifying agents, and the like. A list of such agents may be found in "Detergents and Emulsifiers" published by John W. McCutcheon, Inc., Morristown, N.J., 1962.

There is considerable latitude and variation possible as to the mode and time of application of the inventive herbicidal compositions. For example, the compositions may be hand or machine broadcast, or disced or plowed into the soil or applied as a foliar spray, or as spray on the soil. The preferable procedure is to broadcast or spray the composition on the soil prior to weed emergence. There is no special or critical time of application, this being largely determined by the convenience and preference of the user, except in the case of use in sugar cane where the preferred timing is at planting, at spring cultivation or at layby.

Similarly, the rate of application of the herbicidal composition is varied from one-half to one hundred pounds per acre, usually within the range of one to fifty pounds per acre, dependent upon several factors, such as soil structure, climatic conditions, the stage of growth of the weed and crop, the type of weed or crop as well as whether sterilization or mere eradication of the weeds is sought. The preferred application rate depending upon so called average field conditions will be as follows: for controlling weeds for the few months of growing season in crop average phytotoxic susceptibilities, such as corn, the rate will generally range from one to eight pounds per acre. Where weeds are to be eradicated from a more herbicide-resistant crop, such as sugar cane, the rate of application will range from three to twelve pounds per acre while where the weeds to be eradicated are especially resistant mature plants of several years growth or long term total sterilization up to two to five years is desired, a range of ten to one hundred pounds per acre or higher may be used. Obviously, in soil sterilization the upper limit rate of application is largely dictated by economic considerations.

To illustrate the workings of this invention, representative non-limitative examples of the preparations, formulations and use of the invention are given below in which parts are given by weight and temperatures are in degrees centigrade.

EXAMPLE 1

*Ethyleneglycol bis (2,3,6-trichlorophenylacetate)*

A mixture of two hundred and sixty-four parts of 2,3,6-trichlorophenylacetic acid, thirty-one parts of ethylene glycol, two hundred and fifty parts of xylene, and four parts of p-toluenesulfonic acid was heated to reflux at one hundred and ten to one hundred and thirty degrees in a distillation apparatus fitted with a distillate receiver permitting continuous separation of water and xylene layers and reflux of the xylene back to the heated vessel. When the theoretical weight of water had been collected, the mixture was diluted with an equal volume of xylene, then washed with water and five percent sodium bicarbonate solution, then stripped free of xylene leaving a waxy oily light brown residue in eighty-two percent yield.

*Analysis.*—Calculated for $C_{18}H_{12}O_4Cl_6$: Cl, 42.1%. Found: Cl, 41.8%.

EXAMPLE 2

A mixture of thirty-four hundred and five parts 2,3,6-trichlorophenylacetic acid, eight hundred and seventy-nine parts of ethylene glycol, twenty-three hundred and ten parts of trichloroacetic acid and thirty-five hundred parts of toluene was refluxed for twelve hours with continuous decantation and removal of the water layer of the distillate and continuous recycle of the toluene layer of the distillate. The mixture was then cooled, washed with water, and the toluene stripped off under aspirator vacuum to a pot temperature of one hundred and twenty-eight degrees. The residual liquid was shown to be the mixed ethylene glycol ester of trichloroacetic acid and trichlorophenylacetic acid by its infrared spectrum which resembled very closely a superimposition of the spectra of the two individual ethylene glycol bis esters. However, on distillation, only about ten percent could be taken off in the range of one hundred and forty to one hundred and fifty degrees (two millimeters), the known boiling range of ethylene glycol bis (trichloroacetate), so that it is established that a major part of the mixture must consist of the unsymmetrical ester wherein the two acid moieties are attached to the same glycol molecule.

EXAMPLE 3

A physical mixture of the ethylene glycol bis (2,3,6-trichlorophenylacetate), and ethylene glycol bis (trichloroacetate) was made by mixing at room temperature equimolar amounts of the two separately made esters. This mixture was compared to the product of the foregoing example, by applying each at the rate of two pounds per acre to plots seeded with ryegrass and millet (representative of grassy weeds), prior to emergence of the weeds. Six weeks later, percent control of these grasses was determined relative to untreated comparison plots, with the following results:

| Chemical | Percent Control of Ryegrass | Percent Control of Millet |
|---|---|---|
| Product of Example 2 | 90 | 100 |
| Physical mixture of equimolar amounts of the two esters as described above | 30 | 50 |

Although certain preferred embodiments of the invention have been disclosed for the purpose of illustration, it will be evident that various changes and modifications may be made therein without departing from the scope and spirit of this invention.

What is claimed is:

The product of the process of reacting substantially equimolar proportions of ethylene glycol, 2,3,6-trichlorophenylacetic acid and trichloroacetic acid.

No references cited.

LORRAINE A. WEINBERGER, *Primary Examiner.*

T. L. GALLOWAY, *Assistant Examiner.*